Dec. 8, 1964  C. DE BOER ETAL  3,160,560
STREPTOLYDIGIN AND PRODUCTION THEREOF
Filed Aug. 23, 1957  6 Sheets-Sheet 1

THOMAS EBLE
CHARLES LARGE
CLARENCE DE BOER
ALMA DIETZ
INVENTORS
BY
ATTORNEY

FIGURE 6
INFRARED ABSORPTION SPECTRUM - STREPTOLYDIGIN CALCIUM SALT

THOMAS EBLE
CHARLES LARGE
CLARENCE DE BOER
ALMA DIETZ
INVENTORS
BY
ATTORNEY 3,160,560
STREPTOLYDIGIN AND PRODUCTION THEREOF
Clarence De Boer, Kalamazoo Township, Kalamazoo County, and Alma Dietz, Thomas E. Eble, and Charles M. Large, Kalamazoo, Mich., assignors to The Upjohn Company, Kalamazoo, Mich., a corporation of Michigan
Filed Aug. 23, 1957, Ser. No. 679,984
12 Claims. (Cl. 167—65)

This invention relates to novel compounds possessing antibiotic activity and to a process for the preparation thereof. More particularly, the invention relates to a novel compound referred to herein by the generic name, streptolydigin, to a process for its production by fermentation, to a method for its recovery and concentration from a crude solution including fermentation broths, to its purification, and to its salts and the production thereof.

This application is a continuation-in-part of our copending application Serial No. 464,968, filed October 27, 1954, now abandoned.

It is an object of the present invention to provide a new and useful antibiotic which is active against gram-positive and gram-negative bacteria, against fungi, and against protozoan pathogens. Another object of the invention is to provide salts of this antibiotic. A further object is to provide a process for the production and recovery of this antibiotic. Other objects and features of the invention will be apparent to those skilled in the art to which this invention pertains.

It has been found that by cultivating, under controlled conditions and on suitable culture media, a hitherto undescribed species of microorganism, *Streptomyces lydicus*, isolated from a sample of soil taken in Michigan, a novel compound, streptolydigin, is obtained. A culture of the living organism has been deposited with the Fermentation Division of the Northern Regional Research Laboratory at Peoria, Illinois, and has been added to its permanent collection as NRRL 2433.

A careful study of the morphology and physiology of *S. lydicus* shows it to be distinctly different from any previously described species of Streptomyces in Bergey's "Manual of Determinative Bacteriology," 6th edition, pages 929 to 977, and in Waksman and Lechevalier's "Actinomycetes and Their Antibiotics." The microorganism is characterized in Table I. All seeding was done with a vegetative inoculum grown at 28 degrees centigrade, and in a 500 milliliter Erlenmeyer flask on a reciprocal shaker. The inoculum was Waring blended for one minute. 0.2 milliliter of the blended inoculum was added to each test tube. Readings were taken on the 4th, 7th and 14th days.

TABLE I
*Cultural Characteristics of S. lydicus*

| Medium | Growth | | Soluble Pigment | Remarks |
|---|---|---|---|---|
| | Vegetative | Aerial | | |
| Plain Gelatin Stab | Good | None | Trace of olive color | 3/4 liquefied. |
| Nutrient Gelatin Stab | do | do | do | Do. |
| 0.5% Tryptone-0.3% Yeast Extract Broth | Good (ring around surface; flocculent material at bottom). | do | None | None. |
| Tryptone Broth | Good (flocculent material) | do | do | Indole test negative. |
| Nutrient Broth | Good (ring around surface; flocculent material at bottom). | Slight growth, white | do | None. |
| d-Glucose Broth | do | None | do | Do. |
| Nutrient Nitrate Broth | do | Slight growth, white | do | Nitrate Reduction +, Color on addition of Zn dust-pink. |
| Synthetic Nitrate Broth | Good (flocculent material at bottom). | None | do | Do. |
| Litmus Milk | Good (ring around surface; flocculent material at bottom). | do | do | Wine red color, peptonization +, reduction. |
| Nutrient Agar Slant | Good | do | do | None. |
| d-Glucose Agar Slant | do | Good (gray white) | Yellow | Do. |
| Bennett's Agar Slant | do | Good (heavy gray-white with flecks of flack) "cobweb." | Olive tan | Do. |
| Peptone-Iron Agar Slant | do | None | do | H₂S darkening. |
| Czapek's Sucrose Agar Slant | do | Good (heavy white; slightly cracked surface). | None | None. |
| Nutrient Starch Agar Slant | do | None | do | Do. |
| Starch Agar Plate | | | | Hydrolysis within 4 days. |
| Waksman's Starch Agar A | Good | Good (pink-gray white sporulation). | None | Slight. |
| Waksman's Starch Agar B | do | do | do | Excellent. |
| Nutrient Starch Agar | do | None | do | Good. |
| Casein Starch Agar | do | Good (pink-gray white sporulation). | do | Excellent. |

The utilization of carbon compounds by *S. lydicus* in a synthetic medium is shown in Table II. The procedure of Pridham and Gottlieb, J. Bact. 56, 107–114 (1948), was followed with the following modifications:

(1) Shake flasks were inoculated from a soil stock of *S. lydicus* and incubated at 28 degrees centigrade on a reciprocal shaker.

(2) After 48 hours, the supernatant was decanted. The vegetative growth was washed with 100 milliliters of sterile distilled water and the supernatant was again decanted. 100 milliliters of sterile distilled water was then added to the washed vegetative growth and the mixture was incubated at 28 degrees centigrade on a reciprocal shaker.

(3) After an additional 48 hours, the supernatant was decanted. The vegetative growth was washed as described above and blended in 100 milliliters of sterile distilled water in a Waring blender for one minute.

TABLE II

*Assimilation of Carbon Compounds by S. lydicus in the Synthetic Medium of Pridham and Gottlieb*

| Medium | Results | Medium | Results |
| --- | --- | --- | --- |
| Control | ± | Inulin | (−) |
| d-Xylose | + | Soluble starch | (+) |
| l-Arabinose | + | Glycerol | (+) |
| Rhamnose | (−) | Dulcitol | (−) |
| d-Fructose | + | d-Mannitol | + |
| d-Galactose | + | d-Sorbitol | (+) |
| d-Glucose | + | dl-Inositol | + |
| d-Mannose | + | Na formate | (−) |
| Maltose | + | Na oxalate | − |
| Sucrose | + | Na tartrate | (−) |
| Lactose | + | Na salicylate | − |
| Cellobiose | (+) | Na acetate | (+) |
| Raffinose | + | Na citrate | (+) |
| Dextrin | + | Na succinate | (+) |

+ = Positive assimilation.
− = Negative assimilation.
± = Substantially no growth.
(−) = Slight growth, no assimilation.
(+) = Positive assimilation, only slight growth.

In all cases of assimilation, the aerial mycelium of S. lydicus was gray-white in color.

The culture of S. lydicus produces long, branching, filamentous mycelia. The conidia are spherical to oval in form and are borne in long sporophores slightly coiled at the tip, arising from the aerial mycelium. When grown on Bennett's agar under optimum conditions, the aerial mycelium is cobweb colored (Maerz and Paul, "A Dictionary of Color," 2nd edition, McGraw-Hill Book Company, 1950). Furthermore, a slight olive-tan pigment is produced in the medium. The colonies on Bennett's agar plates are characterized by a white aerial mycelium which turns to a cobweb color as sporulation appears. The colonies are concave on the reverse side and convex on the sporulating surface. Good growth and sporulation occurs at temperatures between 24 and 37 degrees centigrade; the optimum incubation temperature is between 28 and 30 degrees centigrade.

Although S. lydicus is similar in some respects to S. diastaticus (Waksman and Lechevalier's "Actinomycetes and Their Antibiotics," page 56), these microorganisms are readily distinguishable by marked differences in their cultural characteristics which are set forth in Table III.

TABLE III

*Distinguishing Characteristics of S. lydicus and S. diastaticus*

| Medium | Reaction | |
| --- | --- | --- |
| | S. lydicus | S. diastaticus |
| Plain Gelatin Stab | Trace olive pigment ¾ medium liquefied. | No soluble pigment ¼ medium liquefied. |
| Tryptone Broth | No aerial mycelium | Slight white aerial mycelium. |
| Nutrient Agar | do | Cream colored aerial mycelium. |
| Nutrient Nitrate Broth | Reduction+ | Reduction−. |
| Peptone-iron Agar | No aerial mycelium | Cream white aerial mycelium. |
| Bennett's Agar | Heavy gray-white aerial mycelium (with flecks of black as culture ages). | Heavy olive cream aerial mycelium. |

As noted above, S. lydicus, NRRL 2433, can be grown in a culture medium to produce an effective antibiotic material. The culture medium can be any one of a number of media as is apparent from the above described utilization tests. The organism is capable of assimilating many energy sources. However, for economy of production, maximum yield of streptolydigin and ease of isolation thereof, certain culture media are preferable. For example, the presently preferred sources of carbohydrate in the culture medium are glucose, sucrose, and glycerol. Other sources are starch, lactose, dextrin, and the like. The preferred nitrogen sources are soybean meal, brewer's yeast and distillers' solubles, but other sources include corn steep liquor, casein, amino acid mixtures, peptones (meat and soya), and the like.

The nutrient inorganic salts which can be incorporated in the medium include the salts capable of yielding ions such as sodium, potassium, calcium, phosphate, chloride, sulfate, and the like. Inorganic nitrogen sources such as nitrate salts or ammonium salts can also be employed.

Essential trace elements can also be included in the culture medium for growing S. lydicus. Such trace elements are commonly supplied as impurities incidental to the addition of the other constituents of the medium.

For maximum growth and development of S. lydicus, NRRL 2433, the culture medium, prior to inoculation with the organism, should be adjusted to a pH between about 6.0 and about 7.5 and preferably, to a pH of about 7.0. It has been observed that during the growth period of the organism and the production of the antibiotic, the medium gradually becomes alkaline and may attain a pH between about 8.0 and about 8.5, or higher, the final pH being dependent, at least in part, on the initial pH of the medium, the buffers present in the medium and the period of time during which the organism is permitted to grow.

Submerged, aerobic culture conditions are the conditions of choice for the production of large amounts of streptolydigin. For the preparation of limited amounts of the antibiotic, shake flasks and surface cultures in bottles can be employed. When growth is carried out in large tanks, it is preferable to use the vegetative form of the organism for inoculation of the production tanks to avoid a pronounced lag in the production of the antibiotic and the attendant inefficient utilization of the equipment. Accordingly, it is desirable first to produce a vegetative inoculum of the organism by inoculating a relatively small amount of culture medium with the spore form of the organism and when a young, active vegetative inoculum has been secured, to transfer the vegetative inoculum aseptically to large tanks. The medium in which the vegetative inoculum is produced can be the same as, or different from, that utilized for the production of the antibiotic.

S. lydicus, NRRL 2433, can be satisfactorily grown at temperatures between about twenty and about 32 degrees centigrade. Optimum yields of streptolydigin are obtained when the culture medium is manitained at a temperature between about 24 and about 28 degrees centigrade.

The rate of production of streptolydigin and the concentration of the antibiotic activtiy in the culture medium are readily followed during the growth period of the microorganism by testing samples of the culture medium for their antibiotic activity against organisms known to be susceptible to the antibiotic, i.e., M. albus. For such determinations, it is convenient to employ a test which comprises making serial dilutions of the culture samples, adding portions of the diluted samples to melted nutrient agar, solidifying the agar in a petri dish, inoculating the plate with a young culture of *M. albus*, and determining the greatest dilution of the culture medium which causes complete inhibition of the growth of the organism on the nutrient agar.

The production of streptolydigin is followed by turbidimetric test procedures commonly employed in connection with the production of other antibiotics.

In general, maximum production of the antibiotic after inoculation of the culture medium occurs between two and about five days when submerged aerobic cultures are employed, and between about four and about twelve days when surface or shake flask cultures are used.

Streptolydigin is recovered from the culture medium by extractive or adsorptive techniques including adsorption of the antibiotic on cationic, anionic or amphoteric ion-exchange resins such as IRC 50 (a methacrylic acid-divinyl benzene cation-exchange resin) in the sodium cycle, Dowex 1 resin (a strongly basic anion-exchange resin containing quaternary ammonium groups as its functional groups which are attached to a styrene-divinyl benzene copolymer), Permutit DR (a porous anionic polymer with weak anionic-exchange properties for strong acids. See U.S. Patent 2,702,263, column 2, lines 62–73), and the like, and eluting the antibiotic material by suitable eluting agents such as aqueous neutral or acidic alcohol.

For the extraction of antibiotic from the culture medium, water-immiscible, polar organic solvents are preferred such as chlorinated hydrocarbons, for example, methylene chloride, ethylene dichloride, chloroform, and the like; alcohols having slight water-solubility such as 1-butanol, 2-butanol, amyl alcohol, and the like; alkyl esters of fatty acids such as ethyl acetate, propyl acetate, butyl acetate, amyl acetate, and the like; ketones characterized by slight water-solubility such as methylisobutyl ketone, methylamyl ketone, and the like. The extract of the culture broth is then evaporated to dryness, preferably in vacuo, to yield the antibiotic in crude form.

Alternatively, streptolydigin can be separated from the culture broth by contacting the filter broth with an adsorbing agent. Adsorbing agents such as activated alumina, silica gel, magnesium aluminum silicate, and the like, can be used effectively for purification of the antibiotic by adsorption chromatography. Activated carbon can likewise be employed since carbon strongly adsorbs streptolydigin. It is preferable, however, to pretreat the carbon adsorbent with an agent such as acetic acid in order to decrease the strong bonding affinity of the carbon for the antibiotic and thereby facilitate elution of the antibiotic. Elution of the antibiotic from the adsorbent is readily effected by employing a water-immiscible polar organic solvent in which the antibiotic is soluble.

Where an extractive process alone is employed for recovering streptolydigin, a suitable method comprises concentrating the solvent to a relatively small volume and precipitating the antibiotic from the solvent by the addition of a miscible solvent in which the antibiotic is slightly soluble. The antibiotic is then obtained in a crude but solid form. Where the extract has been acidified, i.e., to a pH between about 1.0 and about 5.0, substantially all of the antibiotic is obtained in the form of the free acid. Where the extract is at a pH of about 6.0 or higher, substantially all of the product is obtained in the form of an alkali salt with minor amounts of the free acid.

A preferred method of isolating streptolydigin involves extracting the filtered beer at a pH between 6.0 and 12.0 with a polar, water-immiscible organic solvent such as methylene chloride, ethylene dichloride, chloroform, or the like. The extract is then concentrated, acidified to a pH between about 1.0 and about 5.0 and preferably between 3.5 and 4.5, and a saturated liquid hydrocarbon having between five and eight carbon atoms, i.e., a Skellysolve solvent, preferably a six or seven carbon hydrocarbon such as hexane, or heptane, is added to the acidified organic extract to produce an amorphous precipitate. The precipitate is separated and purified by washing followed by crystallization to obtain the substantially pure antibiotic in the form of the free acid.

It is also possible to extract the antibiotic material from the clear fermentation broth at an acid pH, i.e., between about 2.0 and about 5.0 with a polar, water-immiscible organic solvent, concentrate and treat the extract with a saturated liquid hydrocarbon to obtain all of the crude antibiotic material in the form of the free acid.

Salts of streptolydigin are obtained by treating a solution of the antibiotic in an organic solvent such as ethanol, methanol, ethyl acetate, or the like, with an equivalent amount of base, e.g., sodium hydroxide, potassium hydroxide, calcium hydroxide, and the like, and evaporating the solution to dryness in vacuo. Alternatively, a solution of streptolydigin (acid form) in an organic solvent can be treated with a selected base or a solution thereof, and the salt then precipitated directly from the solution. Illustrative examples of salts which have been prepared are the sodium, potassium, and calcium salts. Others such as the iron; copper; zinc; barium; and amine salts such as mono-, di-, and trimethylamines, mono-, di-, and triethylamines, mono-, di-, and tripropylamines (iso- and normal), ethyldimethylamine, benzyldiethylamine, cyclohexylamine, benzylamine, dibenzylamine, N,N'-dibenzylethylenediamine, bis - (ortho-methoxyphenylisopropyl)amine, and like lower-aliphatic, lower-cycloaliphatic, and lower-aralphatic amines up to and including eight carbon atoms; heterocyclic amines such as piperidine, morpholine, pyrrolidine, piperazine, and the lower-alkyl derivatives thereof such as 1 - methylpiperidine, 1 - ethylpiperidine, 4-ethylmorpholine, 1-isopropylpyrrolidine, 1,4-dimethylpiperazine, 1-n-butylpiperidine, 2 - methylpiperidine, 1-ethyl-2-methylpiperidine, and the like; amines containing water solubilizing or hydrophilic groups such as mono-, di-, and triethanolamines, ethyldiethanolamine, n-butylmonoethanolamine, 2 - amino-1-butanol, 2-amino-2-ethyl - 1,3 - propanediol, 2-amino - 2 - methyl-1-propanol, tris-(hydroxymethyl)aminomethane, phenylmonoethanolamine, p - tertiaryamylphenyldiethanolamine, and glactamine, N-methylglucamine, N-methylglucosamine, ephedrine, phenylephedrine, epinephrine, procaine, and the like; guanidines such as guanidine, diphenylguanidine and the like; quaternary ammonium compounds such as tetramethyl ammonium and tetraethyl ammonium hydroxides and chlorides, and the like, can readily be prepared by the above-mentioned procedures.

In a similar manner, other salts of streptolydigin are prepared by reacting the antibiotic with more complex amines such as the neomycins (including neamine, neomycin B and neomycin C), the erythromycins (including erythromycin and erythromycin B), the tetracyclines, streptomycin and the like.

The process of the invention is not to be limited to the production of streptolydigin by *S. lydicus* or by organisms fully answering the above description which have been given for illustrative purposes only. It is to be understood that the fermentative processes of this invention also embrace other streptolydigin producing strains of *S. lydicus*, such strains being readily produced and isolated by routinely applied isolation and strain-modification methods which include selection of cultured organisms and exposure of organisms to modifying means such as X-ray, ultraviolet light and chemical agents such as, for example, nitrogen mustards, and the like.

Streptolydigin and its salts are characterized by a broad antimicrobial spectrum as shown in Table IV.

TABLE IV

*Antimicrobial Spectrum of Streptolydigin*

| Organism | Minimal Inhibitory Concentration (mcg./ml.) |
|---|---|
| A. Bacteria: broth dilution: | |
| Aerobacter aerogenes | >100 |
| Bacillus brevis | >100 |
| Bacillus cereus | 6.2 |
| Bacillus subtilis | 25 |
| Bacteroides | 25 |
| Brucella bronchiseptica | >100 |
| Clostridium novyi | 0.04 |
| Clostridium botulinum | 3.1 |
| Clostridium perfringens | 0.2 |
| Clostridium septimum | 0.2 |
| Clostridium tetanomorphum | 0.1 |
| Clostridium acetabutylicum | 1.56 |
| Clostridium feseri | 0.39 |
| Clostridium sporogenes | 0.04 |
| Corynebacterium diphtheriae | 25 |
| Corynebacterium diphtheroides | 6.2 |
| Diplococcus pneumoniae F.1 | 0.19 |
| Erysipelothrix rhusiophathiae | 3.12 |
| Escherichia coli | >100 |
| Hemophilus pertussis | >100 |
| Klebsiella pneumoniae | >100 |
| Listerella monocytogenes | 6.25 |
| Micrococcus aureus UC 391 | 100 |
| Micrococcus aureus UC 315 | 25 |
| Micrococcus albus | 25 |
| Mycobacterium avium | 25 |
| Mycobacterium tuberculosis var. hominis (607) | 6.25 |
| Mycobacterium tuberculosis var. hominis (H37RV) | 15 |
| Mycobacterium phlei | 12.5 |
| Mycobacterium ranae | 6.25 |
| Mycobacterium smegmatis | 25 |
| Neisseria catarrhalis | 50 |
| Pasteurella multocida | 6.2 |
| Proteus vulgaris | >100 |
| Pseudomonas aeruginosa | 100 |
| Salmonella enteritidis | >100 |
| Salmonella paratyphi A | >100 |
| Salmonella paratyphi B-4 | >100 |
| Salmonella pullorum | >100 |
| Salmonella typhosa TG3 | 100 |
| Salmonella schottmuelleri | >100 |
| Shigella dispar | >100 |
| Shigella flexneri | >100 |
| Shigella lavington | >100 |
| Shigella paradysenteriae | >100 |
| Streptococcus agalactiae | 12.5 |
| Streptococcus faecalis | 3.12 |
| Streptococcus hemolyticus | .19 |
| Streptococcus lactis | 3.1 |
| Streptococcus mitis | .39 |
| Streptococcus viridans | 6.2 |
| B. Fungi: Agar plate dilution: | |
| Alternaria solani | >1,000 |
| Aspergillus clavatus | >1,000 |
| Aspergillus flavus | >1,000 |
| Blastomyces dermatitidis | >1,000 |
| Candida albicans (4) | >1,000 |
| Coccidioides immitis | 1,000 |
| Cryptococcus neoformans | 1,000 |
| Fusarium lycopersici | >1,000 |
| Geotrichum sp. | >1,000 |
| Glomerella cingulata | >1,000 |
| Histoplasma capsulatum | >1,000 |
| Hormodendrum compactum | 1,000 |
| Microsporum audouini | >1,000 |
| Microsporum canis | >1,000 |
| Monosporium apiospermum | >1,000 |
| Nocardia asteroides | 10 |
| Penicillium chrysogenum | >1,000 |
| Phialophora verrucosa | >1,000 |
| Saccharomyces cerebisiae | >1,000 |
| Sporotrichum schenckii | 1,000 |
| Stemphyllium solani | >1,000 |
| Trichophyton interdigitale | >1,000 |
| Trichophyton rubrum | >1,000 |
| C. Protozoa: Horse serum-saline dilution: Entamoeba histolytica | 10 |

In the agar plate dilution tests, the test organisms were streaked on a series of agar plates containing different concentrations of the antibiotic to determine the minimum concentration of streptolydigin in mcg./ml. of the substrate which inhibited growth over a period of forty hours.

In the broth dilution and horse serum dilution tests, the test organisms were grown in the nutrient broth or the serum saline containing differing amounts of the antibiotic.

Since streptolydigin inhibits streptococci in low concentrations (ca. 39 mcgs./ml.) and requires large amounts (ca. 100 mcgs./ml.) to inhibit the micrococci, this difference in activity is useful for purposes of diagnosis in the differential separation of the etiological agents of infections involving these microorganisms. Because streptolydigin is effective against *Pasteurella multocida*, the causative microorganism of hemorrhage septicemia, an infection of high incidence in cattle shipped to stockyards, and because of its activity against *Nocardia asteroides*, the causative organism of actinomycosis in animals, the use of streptolydigin and derivatives thereof against these infections is likewise indicated. Streptolydigin has not yet been shown to be effective in animals, however. The antibiotic material can also be used as a feed supplement in promoting the growth of animals and poultry either alone or in combination with other antibiotics.

The following table shows the in vivo and in vitro activity of streptolydigin in comparison with some drugs commonly used in the treatment of parasitic diseases.

TABLE V

*Effect of Standard Amebicidal Agents on Experimental Amebiasis in Weanling Rats*

| Drug | CD$_{50}$[1] | MTD[2] | T.I.[3] | In Vitro Endpoint, mcg./ml. |
|---|---|---|---|---|
| Streptolydigin | 123 | +2,000 | 16.2+ | 10 |
|  | 151 |  | 13.2+ |  |
| Emetine | .4 | 4 | 10 | 1.2 |
| Chiniofon | 102 | 1,000 | 9.8 | 150±50 |
|  | 127 |  | 7.9 |  |
|  | 83 |  | 12 |  |
| Entamide (2,2-dichloro-4'-hydroxy-N-methylacet-anilide) | 14.6 | 400 | [4]33 | 1.6 |
|  | 22 |  |  |  |
|  | 22 |  |  |  |
| Carbarsone | 176 | 500 | 2.8 | 10.0 |
| Diiodoquin | 390 | +1,000 | 2.6+ | 3.1 |
| Vioform | 56 | 200 | 3.6 | 1.5 |
| Chlorotetracycline | 28 | +1,000 | 36+ | 37.5±12.5 |
| Tetracycline | 498 | +1,000 | 2.0+ | 19.5 |
|  | 220 |  | 4.6+ |  |
| Cyclohexinide | <.12 | .5 | 4.1+ | 1.0 |
|  | <.03 |  | 17+ |  |
|  | +.03 |  | 17− |  |
|  | .031 |  | 14 |  |
| Fumagillin | 3.6 | 8 | 2.2 | .5 |
|  | 7.6 | 40 | 5.2 | 2.8 |
| Puromycin | 7.05 |  | 5.7 |  |
|  | 6.95 |  | 5.8 |  |
| Novobiocin | 123 | 200 | 1.7 | 500 |
| Nybomycin succinate | 113 | 500 | 4.4 | 25 |
| Nybomycin acetate | 16.7 | 100 | 6.0 | 6 |
| Erythromycin | 43 | +1,000 | 23+ | 4,000 |

[1] Dosage which results in fifty percent survival.
[2] Maximum tolerated dose. Maximum dose that does not adversely affect normal weight gain.
[3] Therapeutic Index, MTD/CD$_{50}$.
[4] Mean of three trials.

The infection is of such severity, that all control rats died. These data demonstrate the effect of amebicidal agents on an experimental intracaecal amebiasis of weanling rats due to *Entamoeba histolytica*. All drugs, except Emetine, were administered orally.

Streptolydigin including derivatives thereof, are useful in combatting many infectious diseases caused by microorganisms in animals. It has not yet been shown to be effective in human therapy, however. For these uses, the antibiotic material is associated with a significant amount of a pharmaceutically acceptable carrier which may be either a solid material, powder, or a liquid. The compositions may take the form of tablets, effervescent tablets, powders, granules, capsules (both hard and soft gelatin capsules), suspensions in edible oils, aqueous suspensions or other dosage forms which are particularly useful for oral administration. Liquid diluents are employed in sterile conditions for parenteral use, that is, by injection. Such a medium may be a sterile solvent or a sterile suspending vehicle containing an injectible oil, or water, aqueous vehicles containing hydrophilic colloids such as sodium carboxymethylcellulose, methylcellulose, polyvinyl pyrrolidone, gelatin, tragacanth, and the like. The compositions may take the form of active material namely, the antibiotic material, admixed with solid diluents and/or tableting adjuvants such as corn starch, lactose, talc, stearic acid, magnesium stearate, gums, and the like. Any of the encapsulating or tableting materials used in pharmaceutical practice may be employed where there is no incompatibility with the antibiotic. The materials may be tabletted with or without adjuvants. Alternatively, the antibiotic may be placed in the usual capsule or resorbable material such as the usual gelatin capsule and administered in that form. In yet another embodiment, the antibiotic may be put up in powder packets and so employed. Streptolydigin, including metal salts and other derivatives thereof, may be prepared in the form of a palatable suspension in a suitable fixed oil containing about two percent aluminum monostearate as a suspending agent. Such a suspension may be given orally as made or may be encapsulated. The antibiotic in the form of ointments including a petrolatum type grease base, creams, water-in-oil emulsions, and lotions are useful topically; useful topical therapeutic preparations include nosedrops, sprays, troches, and suppositories. For veterinary use, the preparation is essentially useful in the form of bougies, mastitis ointments, oil suspensions, and the like.

The percentage of active ingredient in these compositions may be varied. It is necessary that the active ingredient constitute a significant proportion so that a suitable dosage will be obtained. Obviously, several unit dosage forms may be administered at about the same time. Although it is found, particularly on intravenous injection, that a percentage of less than about 0.10 percent of antibiotic is effective, it is preferable to use not less than about 0.10 percent thereof. Tablets or capsules containing from about fifty to about 1000 milligrams of streptolydigin or its derivatives are useful.

Because of its marked antibacterial activity and low toxicity, streptolydigin and its derivatives, especially its salts, are useful as therapeutic agents in the treatment of various diseases. Thus, either alone or advantageously in combination with sulfa compounds such as sulfadiazine, sulfamerazine, sulfamethazine, sulfacetamide, sulfisoxazole, phthalylsulfathiazole, succinylsulfathiazole, sulfamethylthiadiazole, and the like, alone or in combinations (in a ratio of about 1 part of the antibiotic to 2 parts of total sulfa), and the like, or antibiotics such as Penicillins G, O, or V, novobiocin, chloramphenicol, tetracycline, oxytetracycline, chlortetracycline, endomycin, fumagillin, erythromycin, streptomycin, dihydrostreptomycin, terramycin, bacitracin, polymyxin, puromycin, nybomycin, or the like, the antibiotic is useful in the treatment of staphylococcal, streptococcal and pneumococcal pulmonary and respiratory infections, bacterial infections of the skin, lungs, bone, urinary tract and the blood stream. The mode of administration may be via the topical, aerosol, oral, or parenteral route. The antibiotic is likewise useful in combination with various vitamins such as thiamine, riboflavin, ascorbic acid, niacinamide, pyridoxine, pantothenic acid, or pantothenate salts, vitamin $B_{12}$, folic acid, and the like. Other therapeutically useful materials may also be combined with the antibiotic. Streptolydigin and its derivatives are also useful in the treatment of pyodermas, pharyngitis, peritonitis, otitis, rhinitis, and the like, and in combination with corticoids, their therapeutic activity is enhanced in the treatment of atopic and contact dermatitis, neurodermatitis, pruritis, and the like. Suitable corticoids include cortisone, hydrocortisone, and esters thereof; prednisone and prednisolone and the 2-methyl, 6-methyl, 16-hydroxy, and 9-halo derivatives thereof and including esters of these compounds in the 21-position, e.g., acetate, cyclopentylpropionate, hemisuccinate, and the like; including esters thereof, and the like. In the treatment of amebiasis, the antibiotic is also useful in combination with other drugs such as those listed in Table V, particularly with entamide.

The following examples illustrate the production, recovery, concentration, purification and identification of streptolydigin and salts thereof. These examples are merely illustrative in nature and are not to be construed as limiting.

EXAMPLE 1.—PRODUCTION OF STREPTOLYDIGIN

To each of a series of 500-milliliter Erlenmeyer flasks was added 100 milliliters of the following medium:

| | Grams |
|---|---|
| Bacto-peptone (Difco) | 7.5 |
| Yeast Extract (Difco) | 2.5 |
| Cerelose [1] | 5.0 |
| Distilled water to 1000 cc. | |

[1] Non-technical grade of glucose.

The flasks were autoclaved at 121 degrees centigrade for twenty minutes. After cooling, the flasks were inoculated with an aqueous spore suspension obtained from a conventional casein-starch agar slant and this was followed by incubation for approximately 72 hours at a temperature between 24 and 30 degrees centigrade on a reciprocating shaker. Four milliliters of this vegetative seed medium were used to inoculate each of a series of 500-milliliter Erlenmeyer flasks containing 100-milliliter aliquots of the following medium:

| | | |
|---|---|---|
| Sucrose | grams | 30 |
| Calcium carbonate | do | 6 |
| Ammonium sulfate | do | 2 |
| Brewer's yeast | do | 2.5 |
| Corn steep liquor | milliliters | 20 |
| Distilled water up to 1000 cc. | | |

Prior to seeding, the flasks were autoclaved at a temperature of 121 degrees centigrade for twenty minutes and then cooled. The flasks were incubated at 24 degrees centigrade on a reciprocating shaker operating at the rate of 94 four-inch strokes per minute. After a period of 106 hours, a sample of the fermented culture medium assayed 165 S. faecalis units per milliliter.

The above-described procedure was repeated except for the use of the following medium:

| | Grams |
|---|---|
| Cerelose | 10 |
| Starch | 10 |
| N-Z amine B [1] | 4 |
| Brewer's yeast | 4 |
| Ammonium sulfate | 4 |
| Sodium chloride | 4 |
| Calcium carbonate | 4 |
| Distilled water up to 1000 cc. | |

[1] N-Z amine B—a bulk peptone in powder form obtained by the pancreatic digestion of casein.

After a period of 82 hours a sample of the fermented culture medium assayed 167 units per milliliter.

Assays for streptolydigin were obtained by a turbidimetric procedure conducted as follows:

S. faecalis ATCC 6057 is grown on nutrient agar and transferred each week to a new sample of nutrient agar. Each day, a transfer is made into ten milliliters of Difco brain heart infusion (BHI) and the inoculated medium is incubated for about seventeen hours in a water bath maintained at a temperature of 37 degrees centigrade.

The optical density (O.D.) of the culture is then about 3.0 to about 3.5 at 650 m$\mu$ (using a Lumetron manufactured by the Photovolt Corp., N.Y., N.Y.). The inoculum is 1.5 milliliters of the culture (with optical density adjusted to 3.0 at 650 m$\mu$) in 100 milliliters of a double strength sterile brain heart infusion, i.e., concentration of solids doubled.

After preparing varying dilutions of the crystalline antibiotic in sterile broth, including suitable controls, the broths are inoculated and then incubated for a period ranging between four and four and one-half hours in a water bath maintained at a temperature of 37 degrees centigrade. The assay is complete when the optical density of material in the control tube is between 3.0 and 3.2 m$\mu$. Growth is stopped by adding one drop of Mercresin [a mixture consisting of equal parts by weight of secondary amyltricresols, $CH_3(OH)C_6H_3CH(CH_3)C_3H_7$, and o-hydroxyphenylmercuric chloride, $HOC_6H_4HgCl$] to each tube. The optical density at 650 m$\mu$ is recorded and potencies are calculated from a standard curve obtained by plotting optical density vs. log dose of antibiotic. Standard curve points are defined by growth obtained in the presence of 0, 0.25, 0.5, 1.0, 2.0, 4.0, 8.0, 16, 32 and 64 micrograms per milliliter of streptolydigin in pure form. A stock solution is prepared by dissolving fifty milligrams of the antibiotic in sufficient ethanol to cause solution and making the volume up to fifty milliliters by the addition of 0.1 molar phosphate buffer at a pH of 7.4.

EXAMPLE 2.—PRODUCTION AND RECOVERY OF STREPTOLYDIGIN

Spores of *S. lydicus* obtained from a casein-starch agar slant were used to inoculate a 500 milliliter flask containing 100 milliliters of the following sterile seed medium:

| | Grams |
|---|---|
| Cerelose | 20 |
| Soybean meal | 10 |
| Brewer's yeast | 2.5 |
| Ammonium sulfate | 5 |
| Potassium chloride | 3 |
| Calcium carbonate | 4 |
| Water up to 1000 cc. | |

The flask was shaken on a reciprocating shaker at a temperature of 28 degrees centigrade for 48 hours. Twelve liters of sterile medium A in a 25-liter stainless steel fermenter bottle was inoculated with 25 milliliters of medium A. The bottle was incubated at a temperature of 28 degrees centigrade for 48 hours. During this time, the culture was agitated and aerated at a rate of six liters of air per minute. This was the seed medium.

240 liters of sterile medium A in a 100-gallon stainless steel fermenter tank was inoculated with twelve liters of the seed obtained as described above. The fermentation was maintained at a temperature of 28 degrees centigrade and agitated by means of a shrouded impeller with a draft tube baffle. The propeller was rotated at the rate of 280 r.p.m. Air was supplied at the rate of 200 cubic feet per hour.

After a period of 91 hours, a 283-liter aliquot of beer was filtered and extracted at a pH of 3.0 with seventy liters of methylene dichloride. The extracts were stirred with 35 liters of water which had been adjusted to a pH of 7. The methylene dichloride was removed by vacuum distillation and the aqueous concentrate freeze-dried to yield 85 grams of streptolydigin assaying 410 micrograms/mg. (*S. faecalis* turbidimetric assay). The material thus obtained was further purified by treatment involving acidification with sulfuric acid to a pH of 2.5, extraction with ethylene dichloride, drying the extract over magnesium sulfate, and concentration of the extract by vacuum distillation. The residual oil was dissolved in ethyl ether and precipitated with Skellysolve B. There was obtained 23.5 grams of the purified material in the form of the free acid assaying 825 micrograms/mg. (*S. faecalis* turbidimetric assay) and melting between 137 and 139 degrees centigrade.

The free acid is stable at four degrees centigrade for at least four months. It loses half of its activity when kept in a fifty percent ethanol solution for one week at a temperature of 25 degrees centigrade. The antibiotic is completely destroyed by 1 N sulfuric acid in five minutes at fifty degrees centigrade and is stable in 1 N sodium hydroxide in ethanol for thirty minutes at fifty degrees centigrade. When maintained at room temperature and at a pH of 2.0, the antibiotic (in the form of the acid) is destroyed. It loses fifty percent of its activity at a pH of 5.0 when maintained at room temperature for two hours and is completely destroyed in 24 hours. At a pH of 10, the antibiotic is stable for 112 hours at room temperature.

The free acid is substantially insoluble in water or dilute mineral acids (<1 mg./ml.); the sodium salt is very soluble in water. The free acid and its salts are highly soluble in common polar organic solvents such as ethyl acetate, amyl acetate, diethyl ether, acetone, ethanol, dimethyl formamide, methylene chloride, chloroform, methanol, butanol, ethylene dichloride, and the like.

Analysis of streptolydigin (acid form) indicates a tentative empirical formula of $C_{32-35}H_{46-50}O_{9-10}N_2$ and a molecular weight of 603–658.

EXAMPLE 3.—RECOVERY OF STREPTOLYDIGIN

Ten thousand gallons of fermentation broth of pH 6.5 and assaying approximately 135 mcg./ml. (*S. faecalis* turbidimetric assay) was filtered using a filter aid. The filtered culture broth was adjusted to a pH of 7.5 and extracted with 1/5 volume of methylene chloride. The solvent extract was clarified by passing through a De Laval separator and the clarified material was then concentrated to a heavy syrup. Accompanied by agitation, the concentrate was added to five volumes of Skellysolve B thereby precipitating the antibiotic in the form of a salt. The precipitate was filtered and dried in vacuo. There was obtained 4277 grams of antibiotic of a potency of 700 mcg./mg. (*S. faecalis* turbidimetric assay).

4050 grams of the crude salt thus obtained was dissolved in methylene chloride and the solution was slurried with eight liters of a citrate buffer at a pH of 3.95. The solvent layer was decanted and the buffer layer was extracted with twelve liters of methylene chloride. The solvent layer containing the antibiotic and the extract were combined and concentrated in vacuo to dryness. There was obtained 3062 grams of the crude antibiotic in the form of the free acid. The product thus obtained was dissolved in 168 liters of a solvent mixture containing one part of acetone to three parts Skellysolve B. The upper phase containing the antibiotic material was concentrated in vacuo. There was obtained 1383 grams of a partially purified antibiotic material. The product was dissolved in 8.0 liters of acetone and then 4.5 liters of water was added thereto. The resulting solution was chilled at four degrees centigrade and then filtered. There was obtained 816 grams of the crystalline streptolydigin in the form of the free acid possessing a biological potency of 1145 mcg./mg. (*S. faecalis* turbidimetric assay) and a melting point of 147 to 148 degrees centigrade.

Crystalline streptolydigin free acid loses birefringence at 110 degrees and melts between 144 and 150 degrees centigrade. It is characterized by an optical rotation $[\alpha]_D^{25}$=minus 64 degrees to minus 67 degrees (c., two percent in 0.005 N potassium hydroxide in 95 percent ethanol), minus 93 degrees (c., 1.6 percent in chloroform), minus 76 degrees (c., 1.78 percent in dioxan).

Using a Beckman Quartz Spectrophotometer, Model DU, or a Cary Recording Spectrophotometer (crystalline streptolydigin free acid has the following ultraviolet spectra:

In 0.01 N ethanolic potassium hydroxide solution (illustrated in FIGURE II).

| Maxima | Inflection | Minima |
|---|---|---|
| 261 M$\mu$, $E_{1\ cm.}^{1\%}$=223.6 | 302 M$\mu$, $E_{1\ cm.}^{1\%}$=248.4 | 230 M$\mu$, $E_{1\ cm.}^{1\%}$=77.1. |
| 291 M$\mu$, $E_{1\ cm.}^{1\%}$=270.7 | | 270 M$\mu$, $E_{1\ cm.}^{1\%}$=212.2. |
| 336 M$\mu$, $E_{1\ cm.}^{1\%}$=331.0 | | 311 M$\mu$, $E_{1\ cm.}^{1\%}$=231.9. |

Figure 1:
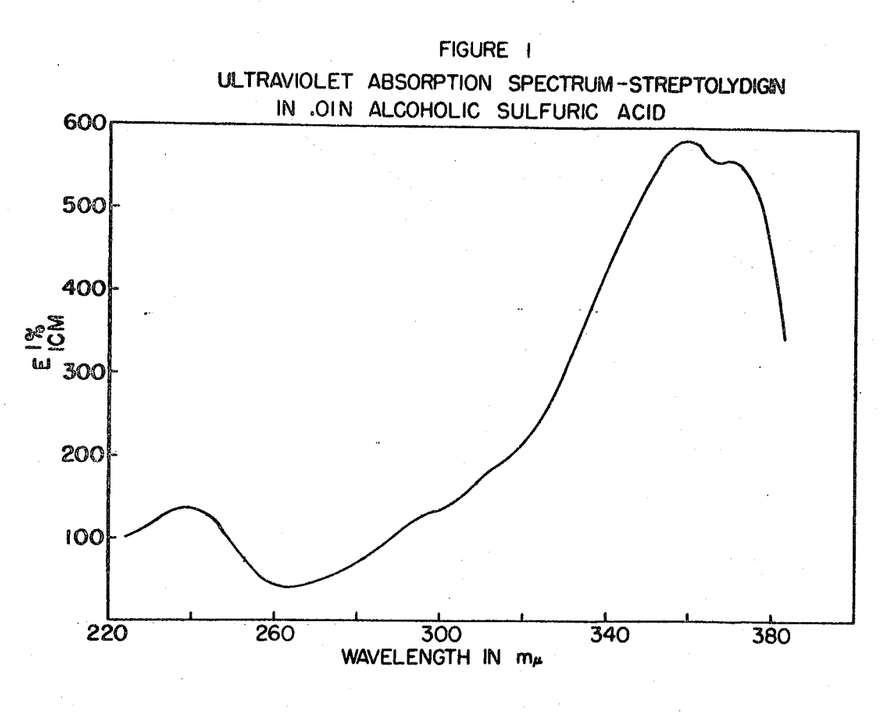
Figure 2:
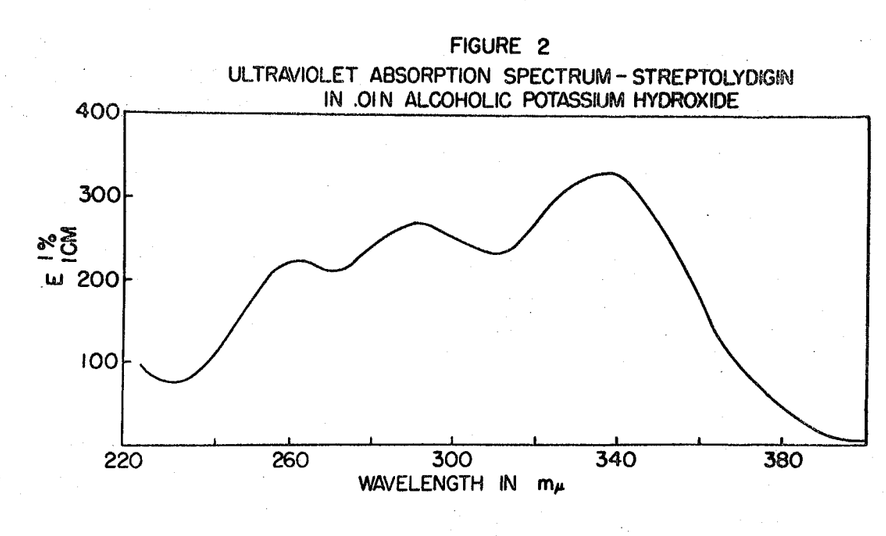

In 0.01 N ethanolic sulfuric acid (illustrated in FIGURE 1).

| Maxima | Inflection | Minima |
|---|---|---|
| 234 M$\mu$, $E_{1\ cm.}^{1\%}$=139.1 | 295 M$\mu$, $E_{1\ cm.}^{1\%}$=127.8 | 264 M$\mu$, $E_{1\ cm.}^{1\%}$=39.3. |
| 357.5 M$\mu$, $E_{1\ cm.}^{1\%}$=590.5 | 309.5 M$\mu$, $E_{1\ cm.}^{1\%}$=17.4 | 366 M$\mu$, $E_{1\ cm.}^{1\%}$=557.8. |
| 370 M$\mu$, $E_{1\ cm.}^{1\%}$=560.3 | 342 M$\mu$, $E_{1\ cm.}^{1\%}$=455.3 | |

The infrared absorption spectrum, FIGURE III (sodium chloride prism), of crystalline streptolydigin free acid in mineral oil suspension shows individual bands, expressed in reciprocal centimeters, at about 3550, 3400 and 3280 characteristic of OH or NH groups. A broad general absorption extends to about 2500 and is characteristic of hydrogen-bonded OH or NH groups. A band at 3070 is characterstic of ethylenic or aromatic C-H groups. The spectrum further shows pronounced bands at 1700, 1643, 1615 and 1570 which probably originate with carbonyl groups (carboxyl and amide) and conjugated carbon-carbon double bonds. Additional characteristic bands occur throughout the spectrum; some of these are relatively prominent bands at 1233, 1204, 1069, 1035 and 976. Specifically, the infrared spectrum of streptolydigin free acid in mineral oil suspension exhibits characteristic absorption bands, expressed n reciprocal centimeters, and intensities as follows:

| | | | |
|---|---|---|---|
| 3550 M | 1443 S | 1110 W | 859 W |
| 3400 W | 1346 W | 1104 W | 829 W |
| 3280 W | 1325 W | 1069 M | 823 W |
| 3070 W | 1291 M | 1035 M | 806 W |
| 2860 S | 1272 M | 1028 M | 768 W |
| 2700 W | 1233 M | 1020 M | 736 W |
| 2500 W | 1211 M | 995 M | 707 W |
| 1700 M | 1204 M | 976 M | 695 W |
| 1643 S | 1156 W | 950 W | 665 W |
| 1615 S | 1149 W | 923 M | |
| 1570 S | 1128 W | 881 M | |

Strepolydigin free acid, prepared according to this example, possesses the fololwing properties:

Interplanar Spacing, A°:    2$\phi$ (Cu K$\alpha_1$), degrees

| | |
|---|---|
| 16.35 | 5.40 |
| 12.80 | 6.90 |
| 10.39 | 8.50 |
| 8.22 | 10.75 |
| 6.88 | 12.85 |
| 6.25 | 14.15 |
| 5.77 | 15.35 |
| 5.08 | 17.45 |
| 4.67 | 19.00 |
| 4.27 | 20.75 |
| 3.95 | 22.50 |

The X-ray diffraction data were obtained by the powder method using a Picker-Waite Diffraction Unit with nickel-filtered copper K$\alpha_1$ radiation.

Optical crystalline properties:
    Crystal system: orthorhombic
    Crystal habit: acicular
    Optic sign: negative
    Dispersion: extreme $R>V$
    Refractive indices: $\alpha$=1.502±0.002,
      $\beta$=1.587±0.002 and $\gamma$=1.669±0.002
    Optic orientation: $a=y$; $b=x$ The following results were obtained in characterization studies for determining the structure of streptolydigin free acid:

| | |
|---|---|
| Ferric chloride | Positive. |
| Idoform | Do. |
| Bromine water | Negative. |
| Strong alkali (10% NaOH) | No ammonium or amine odor. |
| Mineral acid (60° C., 0.1 N HCl) | Complete hydrolysis in 10 minutes. |
| Bromine in carbon tetrachloride | Positive. |
| Fehling (Benedict's modification) | Negative. |
| Molisch | Do. |
| Titanium trichloride test for enediols and enols of 1,3-diketones | Positive. |
| Reduction of 2,61dichlorophenol-indolphenol | Negative. |
| Biuret | Do. |
| Ninhydrin | Do. |

*Analysis.*—Calc. for $C_{32-35}H_{46-50}O_{9-10}N_2$: C, 63.78–63.83; H, 7.64–7.60; N, 4.65–4.25; O, 23.92–24.31. Found: C, 63.68; H, 7.56; N, 4.68; O, 24.08.

On treating 200 milligrams of streptolydigin free acid with bromine in carbon tetrachloride (approximately 150 milligrams of bromine), 150 milligrams of a light yellow addition product is obtained. The product has no definite melting point but chars at temepratures higher than 100 degrees centigrade. The material is characterized by a positive ferric chloride test, is biologically inactive (*S. faecalis* turbidimetric assay), and has weak absorption in the ultraviolet region with maxima at     255 m$\mu$, $E_{1\ cm.}^{1\%}$=195 and 290 m$\mu$, $E_{1\ cm.}^{1\%}$=168

The analytical data agree with the following formula:

*Analysis.*—Calc. for $C_{32}H_{45}O_9N_2Br_3$: C, 45.66; H, 5.35; N, 3.32; Br, 28.53. Found: C, 47.72; H, 5.70; N, 3.53; Br, 27.80.

EXAMPLE 4.—PREPARATION OF SODIUM SALT OF STREPTOLYDIGIN

One gram of streptolydigin (acid form) (Example 2) is dissolved in ten milliliters of ethanol. 1.5 milliliters of 1 N sodium hydroxide and ninety milliliters of water are added to bring the pH of the solution to 9.0. The solution is then freeze-dried. 900 milligrams of a buff-colored powder is obtained characterized by solubility in water, ethanol and chloroform and a biological activity (*S. faecalis* turbidimetric assay) of 1000 micrograms per milligram.

The ultraviolet absorption spectrum of the sodium salt of streptolydigin is characterized as follows:

In 0.01 N alcoholic potassium hydroxide, maxima of 261 m$\mu$, $E_{1\ cm.}^{1\%}$ = 201.3, 291 m$\mu$, $E_{1\ cm.}^{1\%}$ = 243.1 and 335 m$\mu$ $E_{1\ cm.}^{1\%}$ = 291.7 are observed.

Figure 4:
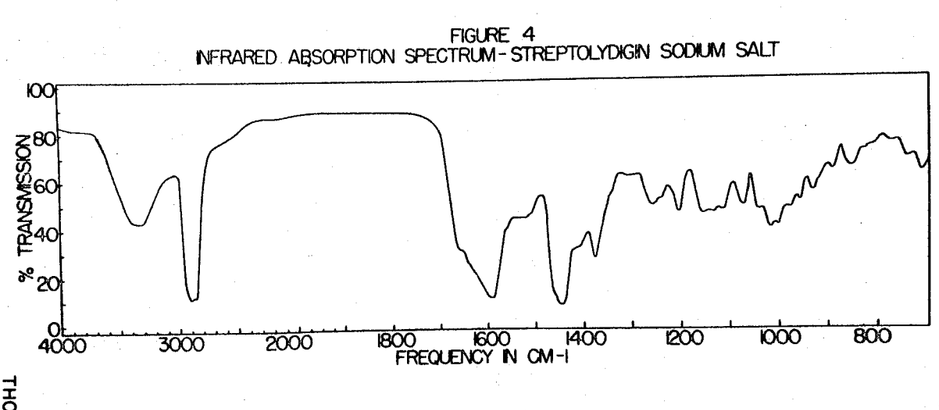

The infrared absorption spectrum (sodium chloride prism), (illustrated in FIGURE 4) of the sodium salt of streptolydigin, in a mineral oil suspension, shows a strong absorption expressed in reciprocal centimeters, at 3350, characteristic of OH and/or NH groups. Broad absorption over the range between 1665 and 1595 is characteristic of carbonyl groups and conjugated carbon-carbon double bonds. Additional characteristic bands appear throughout the spectrum; some of these bands are at 1257, 1202, 1153, 1130, 1110, 1070, 1036, 1017, 998, 927, 850 and 713.

EXAMPLE 5.—PREPARATION OF POTASSIUM SALT OF STREPTOLYDIGIN 500 milligrams of streptolydigin (Example 2) is dissolved in ten milliliters of ethanol. 100 milliliters of water is added and the pH of the solution is adjusted to 7.8 by the addition of 0.1 N potassium hydroxide. The solution is filtered and freeze-dried. There is obtained 400 milligrams of the potassium salt of streptolydigin. The product is soluble in water, alcohol and methylene chloride and has a biological activity (*S. faecalis* turbidimetric assay) of 1036 micrograms per milligram, comparable to that of the free acid.

Figure 5:
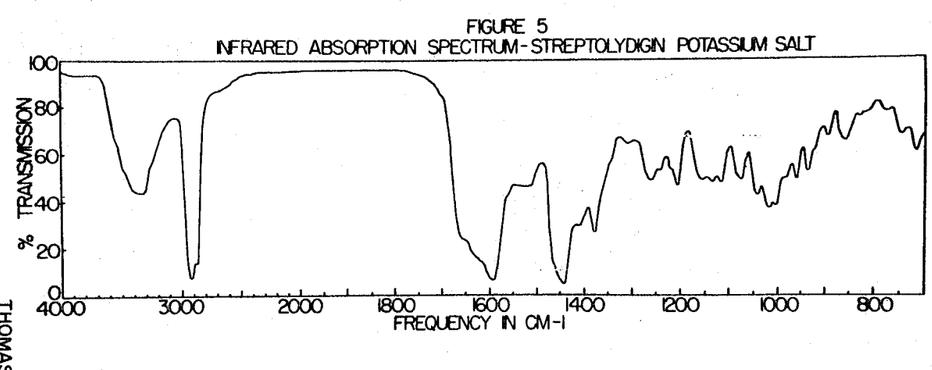

The infrared absorption spectrum (sodium chloride prism), illustrated in FIGURE 5, of the potassium salt of streptolydigin, in a mineral oil suspension, shows a strong absorption, expressed in reciprocal centimeters, at 3340 which is characteristic of OH and/or NH groups. A broad absorption over the range 1655 to 1590 probably originates with carbonyl and C=C groups. Additional characteristic bands occur throughout the spectrum; some of these are relatively prominent bands at 1260, 1204, 1152, 1130, 1118, 1071, 1038, 1015, 998, 930, 853 and 713.

EXAMPLE 6.—PREPARATION OF THE CALCIUM SALT OF STREPTOLYDIGIN 500 milligrams of streptolydigin (Example 2) is dissolved in ten milliliters of ethanol. Ten milliliters of water are added and the pH of the solution is adjusted to 8.0 by the addition of calcium hydroxide. The solution is then freeze-dried. There is obtained 491 milligrams of the calcium salt of streptolydigin. The product is soluble in alcohol and methylene chloride insoluble in water and possesses a biological activity (*S. faecalis* turbidimetric assay) of 967 micrograms per milligram, comparable to that of the free acid.

Figure 6:
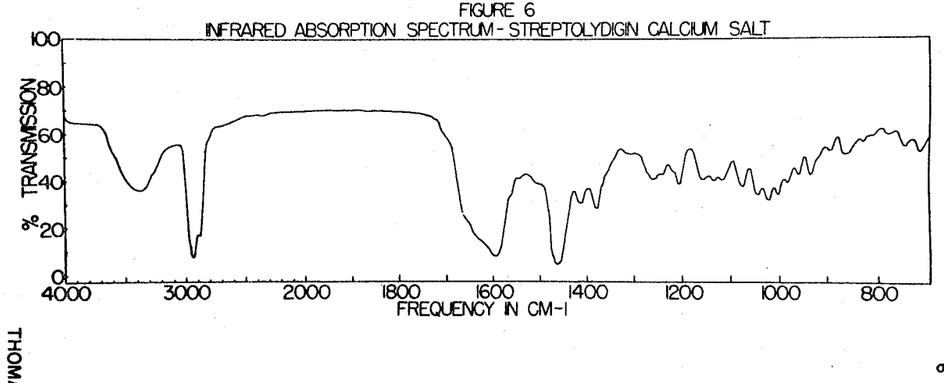

The infrared absorption spectrum (sodium chloride prism), illustrated in FIGURE 6, of the calcium salt of streptolydigin, in a mineral oil suspension, shows a strong absorption, expressed in reciprocal centimeters, at 3380, characteristic of OH and/or NH groups. Broad absorption over the range between 1655 and 1590 is characteristic of carbonyl groups and conjugated carbon-carbon double bonds. Additional characteristic bands appear throughout the spectrum; some of these bands are at 1257, 1202, 1153, 1130, 1110, 1070, 1036, 1017, 998, 927, 850 and 713.

EXAMPLE 7

To prepare amine or ammonium salts of streptolydigin, a solution of the antibiotic in an organic solvent like ethanol, is treated with one equivalent of ammonia or the desired amine such as benzylamine, di-n-propylamine, triethylamine, or the like, to secure the corresponding ammonium or amine salt such as the ammonium salt of streptolydigin, benzylamine salt of streptolydigin, di-n-propylamine salt of streptolydigin, triethylamine salt of streptolydigin, and the like. In a similar manner, additional salts of streptolydigin can be prepared by reacting this compound with other amines such as the neomycins (including neamine and neomycins B and C), erythromycins A and B, and the like.

EXAMPLE 8

500 oral tablets, each containing 500 milligrams of sodium streptolydigin, are prepared from the following types and amounts of materials:

| | |
|---|---|
| Sodium streptolydigin | 8 oz. 357 grs. |
| Lactose, U.S.P. | 2 oz. 77 grs. |
| Corn starch, U.S.P. | 100 grs. |
| Magnesium stearate powder | 20 grs. |
| White mineral oil, U.S.P. | 5 grs. |

The materials are thoroughly mixed and slugged. The slugs are broken down by forcing through a number sixteen screen. The resulting granules are then compressed into tablets, each tablet containing 500 milligrams of sodium streptolydigin.

Using the above procedure, except for the substitution of sodium streptoyldigin by calcium streptolydigin or alkali metal or alkaline earth metal or amine salts of streptolydigin, or the like, the corresponding tablets containing 500 milligrams of calcium streptolydigin, or alkali metal or alkaline earth metal or amine salts of streptolydigin, respectively, or the like, are obtained.

EXAMPLE 9

3000 oral tablets, each containing 125 milligrams of calcium streptolydigin and a total of 500 milligrams (167 milligrams each) of sulfadiazine, sulfamerazine and sulfamethazine are prepared from the following types and amounts of materials:

| | |
|---|---|
| Calcium streptolydigin | 13 oz. 99 grs. |
| Sulfadiazine | 1 lb. 1 oz. 278 grs. |
| Sulfamerazine | 1 lb. 1 oz. 278 grs. |
| Sulfamethazine | 1 lb. 1 oz. 278 grs. |
| Lactose, U.S.P. | 4 oz. 50 grs. |
| Corn starch, U.S.P. | 4 oz. 50 grs. |
| Calcium stearate powder | 90 grs. |
| White mineral oil, U.S.P. | 1 oz. 13 grs. |

The materials are thoroughly mixed and slugged. The slugs are broken down by forcing through a number sixteen screen. The resulting granules are then compressed into tablets, each containing 125 milligrams of calcium streptolydigin and a total of 500 milligrams (167 milligrams each) of sulfadiazine, sulfamerazine and sulfamethazine.

Using the above procedure, except for the substitution of calcium streptolydigin by streptolydigin or sodium streptolydigin or other alkali metal or alkaline earth metal or amine salts of streptolydigin, or the like, the corresponding tablets containing a total of 500 milligrams (167 milligrams each) of sulfadiazine, sulfamerazine and sulfamethazine and 125 milligrams of calcium streptolydigin, streptolydigin, or sodium streptolydigin, or other alkali metal or alkaline earth metal or amine salts of streptolydigin, respectively, or the like, are obtained.

EXAMPLE 10

10,000 two-piece hard gelatin capsules for oral use, each containing 250 milligrams of sodium streptolydigin, are prepared from the following types and amounts of materials:

| | |
|---|---|
| Sodium streptolydigin | 5 lbs. 8 oz. 70 grs. |
| Corn starch, U.S.P. | 3 lbs. 9 oz. |
| White mineral oil, U.S.P. | 4 oz. 250 grs. |
| Magnesium stearate powder | 5 oz. 313 grs. |
| Talc, U.S.P. | 5 oz. 313 grs. |

The materials are thoroughly mixed and then capsulated, each capsule containing 250 milligrams of sodium streptolydigin.

Using the procedure above, except for the substitution of sodium streptolydigin by streptolydigin, or calcium streptolydigin or other alkali metal or alkaline earth metal or amine salts, or the like, the corresponding capsules containing 250 milligrams of sodium streptolydigin, streptolydigin, or calcium streptolydigin, or other alkali metal or alkaline earth metal or amine salts, respectively, or the like, of streptolydigin are obtained.

Using the procedure above, capsules are similarly prepared containing from 125 to 500 milligrams of alkali metal or alkaline earth metal salts, e.g., sodium, calcium or the like, in advantageous combination with other therapeutic materials such as chloramphenicol, tetracyclines, e.g., tetracycline, oxytetracycline, chlortetracycline, including salts thereof (125 to 500 milligrams), neomycin (25 to 250 milligrams), sulfonamides (100 to 500 milligrams) such as sulfadiazine, sulfamerazine, sulfamethazine, sulfacetamide, sulfisoxazole, sulfamethylthiadiazole and the like, alone or in combinations about and succinylsulfathiazole, phthalylsulfathiazole, and the like of relatively insoluble sulfonamide compounds, and endomycin (ten to 100 milligrams), fumagillin and salts thereof (ten to fifty milligrams), novobiocin and salts thereof (10 to 100 milligrams), erythromycin including salts and esters thereof (100 to 500 milligrams), 2,2-dichloro-4'-hydroxy-N-methylacetanilide (100–500 milligrams), nystatin and the salts thereof, streptomycin or dihydrostreptomycin and salts thereof (25 to 500 milligrams); vitamins including thiamine and salts thereof (two to ten milligrams), riboflavin (two to ten milligrams), pyridoxine hydrochloride (0.5 to 2 milligrams), calcium pantothenate (five to fifty milligrams), vitamin $B_{12}$ (one to ten micrograms), nicotinamide (twenty to 150 milligrams), folic acid (0.25 to five milligrams), menadione (0.5 to 2.5 milligrams), ascorbic acid (25 to 150 milligrams), and the like; bacitracin and the salts thereof (500 to 5000 units), polymyxin and salts thereof (100,000 to 500,000 units), and the like, and carbomycin (100 to 500 milligrams), and the like; and arsenicals like acetarsone (100 to 500 milligrams), arsthinol (100 to 500 milligrams), carbarsone (100 to 500 milligrams, glycobiarsol (100 to 500 milligrams), thiocarbarsone (10 to 100 milligrams), and the like; and iodoquinolines like chiniofon (100 to 500 milligrams), diodohydroxyqin (ten to fifty milligrams), iodochlorohydroxyquin (ten to fifty milligrams), chloroquine phosphate (ten to fifty milligrams) and the like.

EXAMPLE 11

A sterile aqueous suspension of streptolydigin is prepared from the following types and amounts of materials:

| | Milligrams |
|---|---|
| Streptolydigin (micronized to particle size of 2 to 10 microns) | 100 |
| Sodium carboxymethylcellulose (viscosity 25 to 50 centipoises at 25° C. and 2% concentration) | 10 |
| Polysorbate 80, U.S.P. (polyoxyethylene[20]sorbitan monooleate) | 4 |
| Propylparaben (propyl ester of p-hydroxybenzoic acid) | 0.42 |
| Water for injection, U.S.P., q.s. 1 milliliter. | |

The sterile antibiotic is dispersed in the sterile vehicle. The pH of the finished product is between 6.3 and 6.8. Each milliliter of the finished preparation contains 100 milligrams of streptolydigin and is suitable for topical (including aural, opthalmic) and parenteral use.

In the above procedure, the free acid streptolydigin can be replaced with an equal amount of its salts like sodium, potassium, zinc, barium, and the like.

Also using the above procedure, sterile aqueous suspensions are similarly prepared containing ten to 100 milligrams of streptolydigin in advantageous combination with other therapeutic materials such as hydrocortisone (five to 25 milligrams) including esters and water-soluble derivatives of hydrocortisone such as hydrocortisone acetate (five to 25 milligrams), sodium succinate salt of hydrocortisone (five to 25 milligrams), sodium dimethylglutarate salt of hydrocortisone (five to 25 milligrams), and the like, prednisone (one to fifteen milligrams), prednisolone (one to fifteen milligrams), esters and water-soluble derivatives of prednisone and prednisolone such as prednisone acetate or prednisolone acetate (one to fifteen milligrams), sodium succinate salt of prednisone or prednisolone (one to fifteen milligrams), sodium dimethylglutarate salt of prednisone or prednisolone (five to fifteen milligrams), and the like.

EXAMPLE 12

Twenty kilograms of an ointment is prepared from the following types and amounts of materials:

| | Grams. |
|---|---|
| 2.5% sodium streptolydigin | 500 |
| 25% white mineral oil, U.S.P. | 5000 |
| 20% wool fat, U.S.P. | 4000 |
| While petrolatum, q.s. to 20,000 grams. | |

The antibiotic material is mixed with the mineral oil and the resulting slurry is milled. The remaining ingredients are melted, strained, and adjusted to fifty to 55 degrees centigrade and then added to the slurry, mixing thoroughly and continuously until the temperature of the mixture has dropped to about 32 degrees centigrade. The resulting preparation is suitable for topical, including ophthalmic, use.

Using the above procedure, except for the substitution of sodium streptolydigin by streptolydigin or other alkali metal or alkaline earth metal, e.g., calcium streptolydigin, or amine and the like, salts of streptolydigin, the corresponding ointments containing streptolydigin or alkali metal like sodium streptolydigin or alkaline earth like calcium streptolydigin or amine, and the like, salts are obtained.

Using the above procedure, ointments are prepared containing ten to 100 milligrams of streptolydigin per gram of ointment (or alkali metal or alkaline earth metal or amine salts of streptolydigin, or the like) in advantageous combination with other therapeutic materials such as hydrocortisone (five to 25 milligrams) including esters and water-soluble derivatives of hydrocortisone such as hydrocortisone acetate (five to 25 milligrams); sodium succinate salt of hydrocortisone (5 to 25 milligrams); sodium dimethylglutarate salt of hydrocortisone (5 to 25 milligrams), or the like; prednisone acetate or prednisolone (one to fifteen milligrams), or an ester or a water-soluble derivative of prednisone or prednisolone such as prednisone acetate or prednisolone acetate (one to fifteen milligrams) sodium succinate salt of prednisone or prednisolone (one to fifteen milligrams), sodium dimethyl glutarate salt of prednisone or prednisolone (one to fifteen milligrams), or the like; mixtures of bacitracin (100 to 1000 units), polymyxin or a salt thereof (2500 to 10,000 units), and an acid salt of neomycin (2.5 to 10 milligrams); a neomycin acid salt and hydrocortisone (5 to 25 milligrams), or an ester or a water-soluble derivative of hydrocortisone such as hydrocortisone acetate (5 to 25 milligrams), sodium succinate salt of hydrocortisone (5 to 25 milligrams), sodium dimethylglutarate salt of hydrocortisone (5 to 25 milligrams), or the like, prednisone or prednisolone (one to fifteen milligrams) or an ester or water-soluble derivative of prednisone or prednisolone such as prednisone acetate or prednisolone acetate (one to fifteen milligrams), sodium succinate salt or sodium dimethylglutarate salt of prednisone or prednisolone (one to fifteen milligrams), or the like.

EXAMPLE 13

An aqueous suspension, for oral use, containing 125 milligrams per five milliliters, of the calcium salt of streptolydigin is prepared from the following types and amounts of materials:

| | Grams |
|---|---|
| Calcium streptolydigin, powdered | 25 |
| Methylparaben, U.S.P. (methyl ester of p-hydroxybenzoic acid) | 0.75 |
| Propylparaben, U.S.P. (propyl ester of p-hydroxybenzoic acid) | 0.25 |
| Sugar, U.S.P. | 650 |
| Tragacanth, U.S.P. | 3 |
| Lecithin | 1 |
| Sodium chloride, U.S.P. | 5 |
| Tween 85 (polyoxyalkylene ether of partial oleic acid ester) | 0.5 |
| Essential oil flavor | 1.5 |
| Deionized water, q.s. to 1000 milliliters. | |

The sugar and tragacanth are thoroughly mixed and dispersed in water, accompanied by stirring. The Parabens, sodium chloride, Tween 85, lecithin and the antibiotic are added, accompanied by stirring. The flavor is then added to the mixture and the resulting preparation passed through a colloid mill to assure a uniform dispersion.

Using the procedure described above, except for the substitution of calcium streptolydigin by other alkaline earth metal, or insoluble amine, or the like salts of streptolydigin (e.g., procaine streptolydigin, and the like), the corresponding aqueous suspensions of other alkaline earth metal or insoluble amine, or the like salts of streptolydigin, are obtained.

EXAMPLE 14

An aqueous suspension, for oral use, containing in each five milliliters 75 milligrams of the calcium salt of streptolydigin and 75 milligrams of tetracycline base is prepared from the following types and amounts of materials:

| | Grams |
|---|---|
| Calcium streptolydigin, powdered | 15 |
| Tetracycline base, powdered | 15 |
| Methylparaben, U.S.P. | 0.75 |
| Propylparaben, U.S.P. | 0.25 |
| Sodium chloride, U.S.P. | 3.5 |
| Sucrose, U.S.P. | 650 |
| Tragacanth powder, U.S.P. | 2 |
| Tween 85 | 0.3 |
| Essential oil flavor | 1 |
| Deionized water, q.s. to 1000 milliliters. | |

The method of processing is similar to that used in Example 13 above. Per each milliliter, the amounts of calcium streptolydigin and tetracycline can vary from five to fifty milligrams. The combination of streptolydigin and tetracycline has shown unexpected synergistic antibacterial activity as well as usefulness in counteracting the development of bacterial resistance to streptolydigin or tetracycline. Compositions containing from approximately five to approximately 95 parts by weight of streptolydigin together with from about 95 to about five parts by weight of tetracycline are preferred and exert the synergistic activity described above.

Using the formula and procedure described above, except for the substitution of calcium streptolydigin by other alkaline earth metal, or insoluble amine, or the like salts of streptolydigin (e.g., procaine streptolydigin, and the like), the corresponding aqueous suspensions of other alkaline earth metal or insoluble amine, or the like salts of streptolydigin in combination with tetracycline, are obtained.

Other broad-spectrum antibiotics which can be substituted for the tetracycline in the above compositions with resulting therapeutic advantage include oxytetracycline, chlortetracycline, chloramphenicol, and erythromycin.

EXAMPLE 15

10,000 two-piece hard gelatin capsules for oral use each containing 25 milligrams of sodium streptolydigin and 100 milligrams of tetracycline hydrochloride, are prepared from the following types and amounts of materials:

| | |
|---|---|
| Sodium streptolydigin | 9 oz. 58 grs. |
| Erythromycin hydrochloride | 2 lbs. 3 oz. 116 grs. |
| Corn starch, U.S.P. | 3 lbs. 9 oz. |
| White mineral oil, U.S.P. | 4 oz. 250 grs. |
| Magnesium stearate powder | 5 oz. 313 grs. |
| Talc, U.S.P. | 5 oz. 313 grs. |

In the above there can be substituted for the tetracycline hydrochloride, entamide or other amoebocides.

The finely powdered ingredients are thoroughly mixed and then capsulated, each capsule containing 25 milligrams of sodium streptolydigin and 100 milligrams of tetracycline hydrochloride. For each capsule, the amounts of sodium streptolydigin and tetracycline hydrochloride can vary from 25 to 500 milligrams. This combination of antibiotics has shown unexpected synergistic antibacterial activity as well as usefulness in counteracting the development of microbial resistance. Capsules containing from about five to about 95 parts by weight of streptolydigin together with from about 95 to about five parts by weight of tetracycline are preferred and exert the therapeutic advantages described above.

Using the formula and procedure described above, except for the substitution of sodium streptolydigin by streptolydigin, calcium streptolydigin, or other alkali metal or alkaline earth metal or amine salts, or the like, the corresponding capsules of streptolydigin, calcium streptolydigin or other alkali metal or alkaline earth metal or amine salts, respectively, or the like, of streptolydigin together with tetracycline are obtained.

Other broad-spectrum antibiotics which can be substituted for the tetracycline in the above capsules with resulting therapeutic advantage include oxytetracycline, chlortetracycline and chloramphenicol, tetracycline, erythromycin, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process which comprises cultivating *Streptomyces lydicus* NRRL 2433 under aerobic conditions in a culture medium containing an assimilable carbohydrate, sources of organic nitrogen, and inorganic salts until substantial antibiotic activity is imparted to said culture medium.

2. A process which comprises cultivating *Streptomyces lydicus* NRRL 2433 under submerged aerobic conditions in a culture medium containing an assimilable carbohydrate, organic nitrogen, and inorganic salts until substantial antibiotic activity is imparted to said culture medium and recovering the antibiotic activity from said culture medium.

3. A method according to claim 2 which includes the step of extracting the culture broth at a pH between 6.0 and 12.0 with an inert, lower aliphatic water-immiscible, polar organic solvent for streptolydigin, selected from the class consisting of chlorinated hydrocarbons, alcohols having slight water solubility, fatty acid alkyl esters, and ketones having slight water solubility.

4. A method according to claim 2 in which the culture medium is maintained at a temperature between about twenty and about 32 degrees centigrade and the growth of the organism is carried out for a period of from two to about five days.

Figure 3:
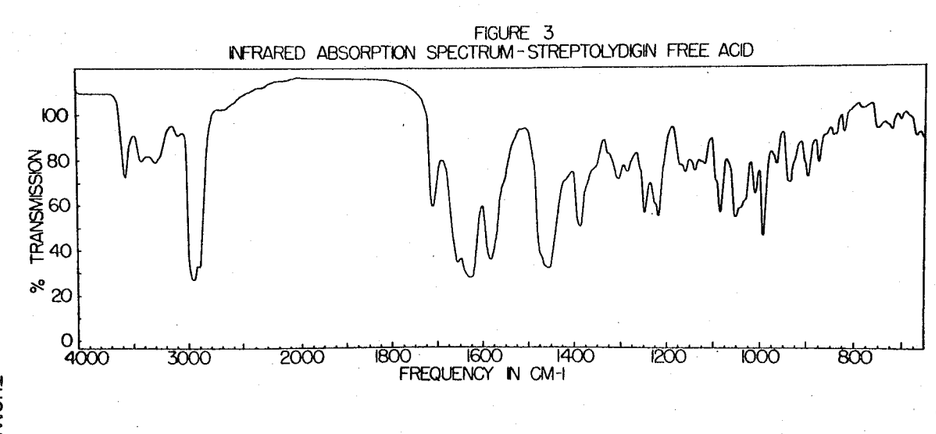

5. An antibiotic substance characterized by being soluble in ethyl acetate, amyl acetate, diethyl ether, acetone, ethanol, dimethyl formamide, methylene chloride, chloroform, butanol, and ethylene dichloride; and substantially insoluble in water and hydrochloric acid; by a crystalline structure in the pure state; and in its essentially pure crystalline form by consisting of the elements carbon, hydrogen, nitrogen and oxygen in the following proportions: C, 63.68, H, 7.56, N, 4.68, O, 24.08; by having a molecular weight of 606–658; having a melting point between 147 and 148 degrees centigrade; by an optical rotation $[\alpha]_D^{25}$=minus 64 to minus 67 degrees (c., two percent in 0.005 N potassium hydroxide in 95 percent ethanol), minus 93 degrees (c., 1.6 percent in chloroform), minus 76 degrees (c., 1.78 percent in dioxane); by an ultraviolet absorption spectrum in 0.01 N ethanolic potassium hydroxide solution and by having an infra-red spectrum when suspended in mineral oil as shown in FIGURE 3 in the drawing.

6. The sodium salt of the antibiotic described in claim 5.

7. The potassium salt of the antibiotic described in claim 5.

8. The calcium salt of the antibiotic described in claim 5.

9. An antibiotic substance selected from the group consisting of streptolydigin acid as defined in claim 5 and the salts thereof.

10. The antibiotic substance of claim 5 in its essentially pure crystalline form.

11. A method according to claim 2 which includes the step of extracting the culture broth at a pH between 2.0 and 5.0 with an inert, lower aliphatic water-immiscible, polar organic solvent for streptolydigin, selected from the class consisting of chlorinated hydrocarbons, alcohols having slight water solubility, fatty acid alkyl esters, and ketones having slight water solubility.

12. A compound as defined in claim 5, streptolydigin, in its essentially pure form.

| Maxima | Inflection | Minima |
|---|---|---|
| 261 M$\mu$, $E_{1\ cm.}^{1\%}$=223.6 | 302 M$\mu$, $E_{1\ cm.}^{1\%}$=248.4 | 230 M$\mu$, $E_{1\ cm.}^{1\%}$=77.1. |
| 291 M$\mu$, $E_{1\ cm.}^{1\%}$=270.7 | | 270 M$\mu$, $E_{1\ cm.}^{1\%}$=212.2. |
| 336 M$\mu$, $E_{1\ cm.}^{1\%}$=331.0 | | 311 M$\mu$, $E_{1\ cm.}^{1\%}$=231.9. | in 0.01 N ethanolic sulfuric acid

| Maxima | Inflection | Minima |
|---|---|---|
| 234 M$\mu$, $E_{1\ cm.}^{1\%}$=139.1 | 295 M$\mu$, $E_{1\ cm.}^{1\%}$=127.8 | 264 M$\mu$, $E_{1\ cm.}^{1\%}$=39.3. |
| 357.5 M$\mu$, $E_{1\ cm.}^{1\%}$=590.5 | 309.5 M$\mu$, $E_{1\ cm.}^{1\%}$=17.4 | 366 M$\mu$, $E_{1\ cm.}^{1\%}$=557.8. |
| 370 M$\mu$, $E_{1\ cm.}^{1\%}$=560.3 | 342 M$\mu$, $E_{1\ cm.}^{1\%}$=455.3 | |

References Cited in the file of this patent

UNITED STATES PATENTS

| | | |
|---|---|---|
| 2,649,401 | Haines et al. | Aug. 18, 1953 |
| 2,691,618 | Tanner et al. | Oct. 12, 1954 |
| 2,757,123 | Sabin et al. | July 31, 1956 |
| 2,796,379 | Tanner et al. | June 18, 1957 |
| 2,799,620 | Waksman et al. | July 16, 1957 |
| 2,805,185 | Hermann et al. | Sept. 3, 1957 |
| 2,806,024 | Bird et al. | Sept. 10, 1957 |
| 2,908,611 | Dutcher et al. | Oct. 13, 1959 |
| 2,908,612 | Dutcher et al. | Oct. 13, 1959 |
| 2,931,798 | Umezawa | Apr. 5, 1960 |

OTHER REFERENCES

Alexopoulos: Ohio Journal of Science, 1941, pp. 425–430.

Smith: Thesis at the University of Wisconsin, January 23, 1953, pp. 55 to 58, 60 to 70.

Antibiotics Annual, 1955 to 1956, pp. 886 to 902.

Sneath: J. General Microbiology, August 1957, pp. 184–200.

Pridham et al.: Applied Microbiology, January 1958, vol. 6, No. 1, pp. 52–79.

Baldacci et al.: Giornale di Microbiologia, September–October 1955, pp. 128–143.

Waksman: Antibiotic Medicine and Clinical Therapy, vol. 5, No. 10, October 1958, pp. 573–576.

Waksman et al.: Bacteriological Reviews, March 1957, pp. 1–29.